Feb. 10, 1931.  W. J. ANDRES  1,791,652
BRAKE
Original Filed Oct. 30, 1926

INVENTOR.
William J. Andres
BY
ATTORNEY.

Patented Feb. 10, 1931

1,791,652

UNITED STATES PATENT OFFICE

WILLIAM J. ANDRES, OF SOUTH BEND, INDIANA, ASSIGNOR TO BENDIX BRAKE COMPANY, OF SOUTH BEND, INDIANA, A CORPORATION OF ILLINOIS

BRAKE

Original application filed October 30, 1926, Serial No. 145,148. Divided and this application filed September 6, 1928. Serial No. 304,184.

This invention relates to brakes, and is illustrated as embodied in novel operating means for an automotive brake of the duplex type.

An object of the invention is to utilize yielding means such as rubber bushings, to support the brake applying structure of a duplex brake in such a manner as to permit the applying structure to shift crosswise sufficiently to center the same automatically thus compensating for slight differences in wear or in adjustment of different parts of the brake.

A further object of the invention relates to the provision of a novel arrangement of friction devices and operating means therefor wherein the operating structure is yieldingly supported intermediate the friction device. In the embodiment illustrated I preferably provide co-axial telescoping shafts provided each with a cam, each shaft being preferably bonded to juxtaposed rubber bushings, the latter in turn being bonded to a novel two-part support interposed between the friction devices and secured to the axle structure. Such a structure supplements the action of the return springs by resisting angular brake-applying movement of the shafts, obviates the need of lubricating the shaft bearing and lastly provides for an even application of braking pressure, preventing grabbing or chattering of the brake.

The above and other objects and features of the invention, including various novel combinations of parts and desirable particular constructions, will be apparent from the following description of the illustrative embodiment shown in the accompanying drawing, in which.

Figure 1:
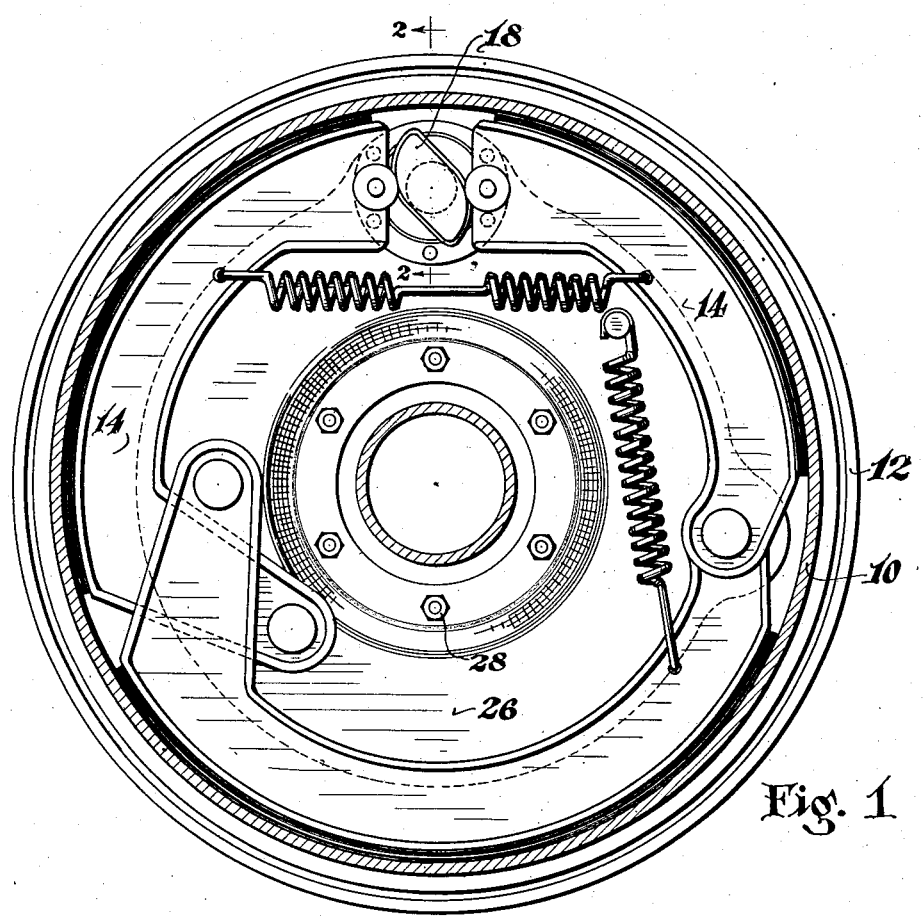
Figure 1 is a side elevation of a brake employing my novel operating structure, the same being taken just inside the head of the drum.

As indicated in Figure 1, the brake includes a rotatable drum 10, at the open side of which is a stationary support such as a backing plate 12. Within the drum there are arranged, side by side, two friction devices 14 and 16, for example arranged as described in Patent No. 1,295,506 to Howe, granted February 25, 1919. The friction devices are applied by means such as two double cams 18 and 20, carried respectively by an inner shaft 22, preferably solid, and by a hollow outer shaft 24 surrounding and coaxial with respect to the shaft 22, the latter passing through an opening 25 in the backing plate.

According to an important feature of my invention, I provide a novel supporting bracket for the shafts preferably arranged between the two brakes, the illustrated bracket including a first stamping 26 generally circular in outline and which may be secured in any desired manner as by bolts 28 to the axle housing of a rear brake or to the steering knuckle of a front brake.

Figures 2, 3:
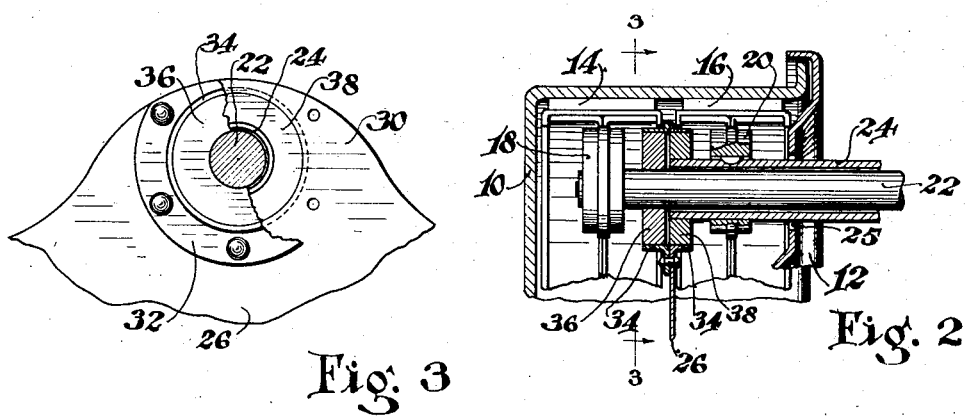
Figure 2 is a vertical section through the upper part of the brake taken on line 2—2 of Figure 1.
Figure 3 is a fragmentary view, parts being broken away, indicating the two sections of my novel support structure.

As disclosed in Figures 1 and 3, the stamping 26 is flared outwardly at 30 to provide the supporting portion for the brake operating structure and a second stamping 32 is preferably riveted or otherwise secured thereto. The two stampings are preferably formed with coaxial and oppositely-extending integrally-drawn half sleeves 34, within which are bonded two rubber bushings 36 and 38 (or equivalent yielding means) supporting respectively the two shafts 22 and 24. Bushing 36 is preferably bonded to shaft 22 just beyond the end of shaft 24, and bushing 38 is preferably bonded to shaft 24 at its end. It will be seen that the two shafts can shift independently of each other, this being permitted by the clearance of shaft 24 about shaft 22.

In operation rotation of either cam shaft to apply its brake is impeded by the torsional stress set up by the bonded rubber bushing thus supplementing the brake return spring action. The yieldable nature of the bushing, however, permits the cam to center itself with respect to the ends of the friction device, thus equalizing the applying pressure and as a further virtue lubrication of the parts is obviated.

While one illustrative embodiment of my invention has been described in detail, it is not my intention to limit its scope to this particular embodiment, or otherwise than by the terms of the appended claims.

The invention heretofore described constitutes a division of my earlier filed application No. 145,148, filed October 30, 1926.

I claim:

1. A duplex brake comprising, in combination, a drum, a pair of friction devices arranged side by side and engageable with adjacent zones of the drum, a support between the friction devices, a closure plate at the open side of the drum, an operating device for each of the friction devices, a pair of coaxial shafts extending into the drum and actuating the operating device, each of said shafts being yieldingly supported by said first-mentioned support.

2. A duplex brake comprising, in combination, a drum, a pair of friction devices arranged side by side and engageable with adjacent zones of the drum, a support between the friction devices, an operating device for each of the friction devices, a pair of coaxial shafts extending into the drum and actuating the operating devices, means secured to said support and shafts and connecting the same, said support and shafts being so connected as to permit universal movement of the latter.

3. A duplex brake comprising, in combination, a drum, a pair of friction devices arranged side by side and engageable with adjacent zones of the drum, operating means for said friction devices and a support for said means between the two friction devices connected to said operating means by means constructed and arranged to permit universal movement of the operating means.

4. A duplex brake comprising, in combination, a drum, a support plate, a pair of friction devices and operating means for said devices supported by means permitting a universal movement of said operating means with respect to said support plate.

5. A duplex brake, comprising, in combination, a pair of friction devices, operating means for said devices including brake-applying devices, operating shafts therefor, and an elastic bearing secured to each shaft resisting angular brake-applying movement of the shaft and at the same time yieldable to permit each shaft to shift across its axis so that the brake applying devices may be self centering.

6. Operating means for duplex brakes comprising, in combination, a shaft having applying means for one brake adjacent its end, a hollow shaft surrounding the first shaft and having applying means for the other brake adjacent its end, and supporting means for said ends of the two shafts including yieldable bearings permitting centering movements of the two applying means by crosswise shifting of the two shafts, and also resisting angular brake-applying movements of the shafts.

7. Operating means for duplex brakes comprising, in combination, a shaft having applying means for one brake adjacent its end, a hollow shaft surrounding the first shaft and having applying means for the other brake adjacent its end, and supporting means for said ends of the two shafts including rubber bushings forming shaft bearings permitting centering movements of the two applying means by crosswise shifting of the two shafts.

8. Operating means for duplex brakes comprising, in combination, a shaft having applying means for one brake adjacent its end, a hollow shaft surrounding the first shaft and having applying means for the other brake adjacent its end, a support adjacent said ends of the shafts, and yieldable means carried by the support and in turn supporting the shafts.

9. Operating means for duplex brakes comprising, in combination, a shaft having applying means for one brake adjacent its end, a hollow shaft surrounding the first shaft and having applying means for the other brake adjacent its end, a support adjacent said ends of the shafts, and a pair of yielding bushings carried by the support and respectively independently supporting said ends of the shafts.

10. Operating means for duplex brakes comprising, in combination, a shaft having applying means for one brake at its end, a hollow shaft surrounding the first shaft and having applying means for the other brake a short distance from its end, and resilient means supporting the two shafts at the end of the hollow shaft, between the two applying means.

11. Operating means for duplex brakes comprising, in combination, a shaft having applying means for the brake at its end, a hollow shaft surrounding the first shaft and having applying means for the other brake a short distance from its end, and a pair of yielding bushings independently supporting the two shafts respectively at the end of the hollow shaft, between the two applying means.

12. Operating means including a pair of coaxial shafts, the inner one of which projects beyond the outer, in combination with a support surrounding the shafts substantially at the end of the outer shaft, a yielding bushing carried by the support and sleeved on the end of the outer shaft, and another yielding bushing carried by the support and sleeved on the end of the inner shaft just beyond the end of the outer shaft.

13. Operating means including a pair of coaxial shafts, the inner one of which projects beyond the outer, in combination with a support surrounding the shafts substantially at the end of the outer shaft, a yielding bushing carried by and secured to the support and sleeved on and secured to the end of the outer shaft, and another yielding bushing carried by and secured to the support and sleeved on and secured to the end of the inner shaft just beyond the end of the outer shaft, said bushings resisting angular movements of their respective shafts.

14. Operating means including a pair of coaxial shafts, the inner one of which projects beyond the outer, in combination with a support surrounding the shafts substantially at the end of the outer shaft, and a pair of rubber bushings externally bonded to said support and internally bonded respectively to the end of the outer shaft and to the inner shaft just beyond the end of the outer shaft.

15. A brake structure comprising, in combination, a support provided with an outwardly drawn tubular bearing portion and a correspondingly shaped tubular stamping in coaxial alignment with said bearing portion.

16. A brake comprising a plurality of friction devices, a support extending between said devices and operating means yieldingly supported by said support.

17. A brake comprising a plurality of friction devices, a support extending between said devices and operating means yieldingly supported by said support intermediate said friction devices.

18. Operating means including a pair of coaxial relatively shiftable shafts, in combination with a support surrounding the shafts and yieldably connected to both.

19. A duplex brake comprising, in combination, a drum, a pair of friction devices arranged in juxtaposition and engageable with adjacent zones of the drum, a support between the friction devices, a closure plate at the open side of the drum, an operating device for each of the friction devices, a pair of co-axial shafts extending into the drum and secured to said operating devices, each of said shafts being resiliently supported by said first-mentioned support.

In testimony whereof I have hereunto signed my name.

WILLIAM J. ANDRES.